United States Patent
Chen

(10) Patent No.: US 12,489,882 B2
(45) Date of Patent: Dec. 2, 2025

(54) STEREOSCOPIC DISPLAY DEVICE FOR MATCHING POLARIZED VIEWING ANGLES AND VIDEO STREAMS AND STEREOSCOPIC DISPLAY METHOD THEREOF

(71) Applicant: LIGHT MTRIX INC., Taipei (TW)

(72) Inventor: Wei-Ting Chen, Taipei (TW)

(73) Assignee: LIGHT MATRIX INC., Taipei (TW)

( * ) Notice: Subject to any disclaimer, the term of this patent is extended or adjusted under 35 U.S.C. 154(b) by 0 days.

(21) Appl. No.: 18/216,609

(22) Filed: Jun. 30, 2023

(65) Prior Publication Data

US 2024/0007611 A1    Jan. 4, 2024

(30) Foreign Application Priority Data

Jun. 30, 2022  (TW) .................................. 111124521

(51) Int. Cl.
*H04N 13/398* (2018.01)
*H04N 13/31* (2018.01)
*H04N 13/351* (2018.01)

(52) U.S. Cl.
CPC ........... *H04N 13/398* (2018.05); *H04N 13/31* (2018.05); *H04N 13/351* (2018.05)

(58) Field of Classification Search
CPC .... H04N 13/31; H04N 13/327; H04N 13/351; H04N 13/398
See application file for complete search history.

(56) References Cited

U.S. PATENT DOCUMENTS

| | | | |
|---|---|---|---|
| 8,723,920 B1* | 5/2014 | Hoppenstein | H04N 13/239 348/42 |
| 2011/0234763 A1* | 9/2011 | Hwang | H04N 21/2365 348/42 |
| 2014/0118512 A1* | 5/2014 | Park | H04N 13/366 348/54 |
| 2014/0320614 A1* | 10/2014 | Gaudreau | H04N 13/366 348/51 |
| 2016/0301918 A1* | 10/2016 | Mukhtarov | G02B 30/30 |

* cited by examiner

*Primary Examiner* — Jessica M Prince
(74) *Attorney, Agent, or Firm* — Chih Feng Yeh; Yongjean Consulting Inc.

(57) ABSTRACT

A stereoscopic display device for matching polarized viewing angles and video streams and a stereoscopic display method are disclosed. In the stereoscopic display device, time-synchronized video streams are obtained from the multi-source video stream, and images of the n-th video stream are outputted to the n-th, (M+n)-th, (2M+n)-th . . . display pixel columns of a display module based on a capture angle of the n-th video stream, to make the images of the n-th video stream displayed on the n-th, (M+n)-th, (2M+n)-th . . . display pixel columns of the display module be viewed by a different viewing angle through parallax barriers controlled by the display module. As a result, the effect of displaying 3D video stream on the existing 3D digital photo frame can be to achieved.

10 Claims, 7 Drawing Sheets

【Fig. 1 (Prior Art)】

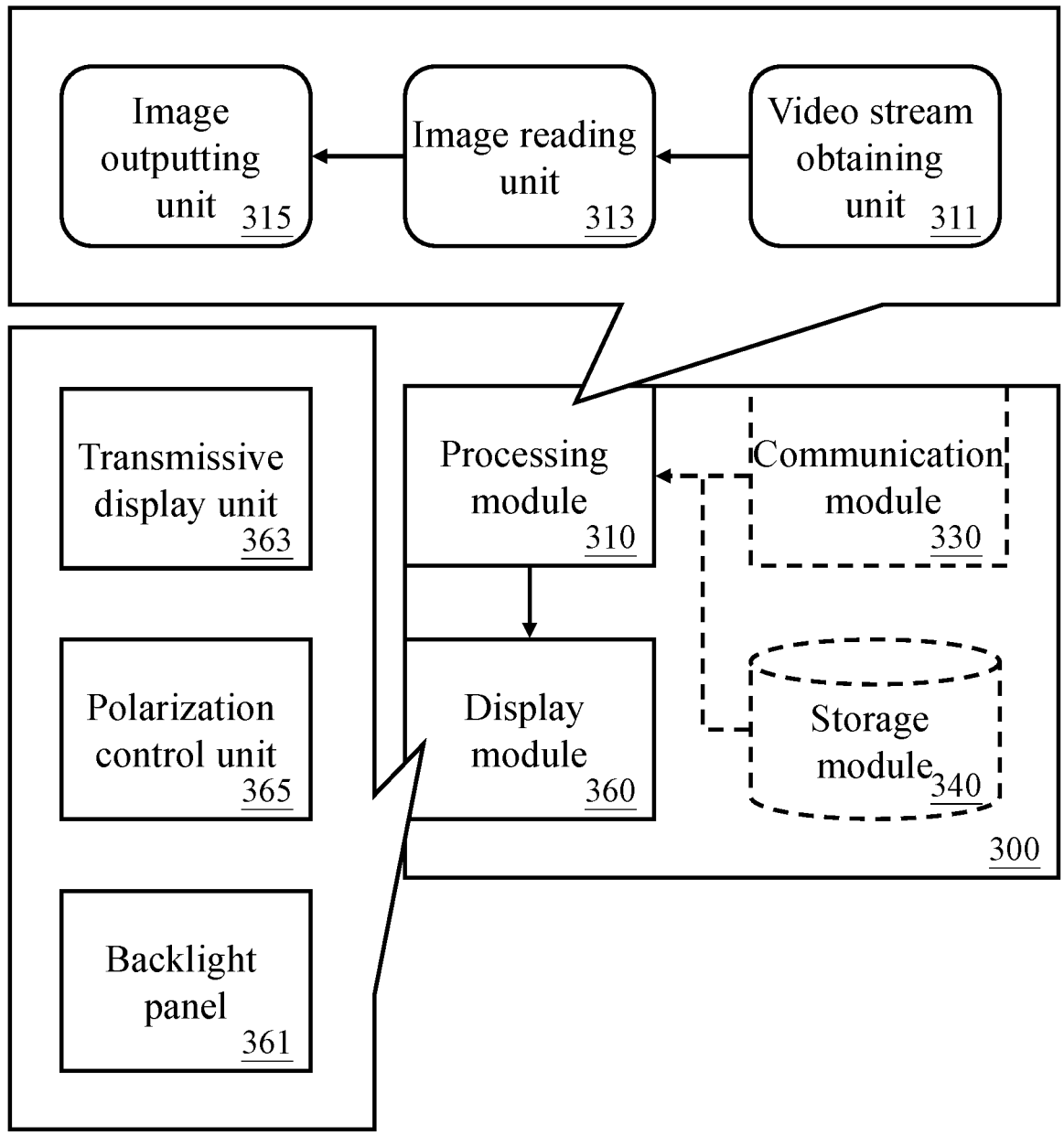
[Fig. 3]

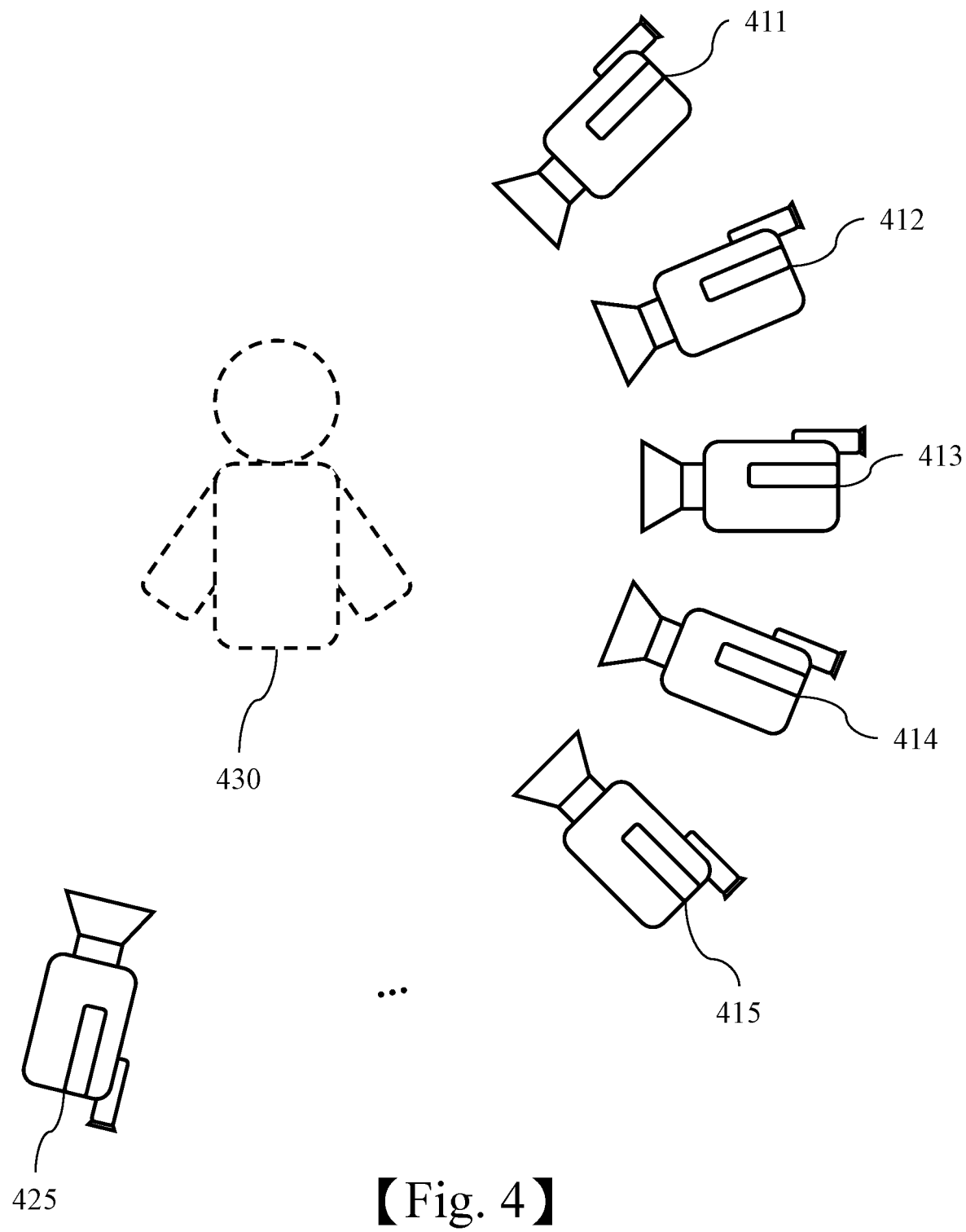
【Fig. 4】

[Fig. 5]

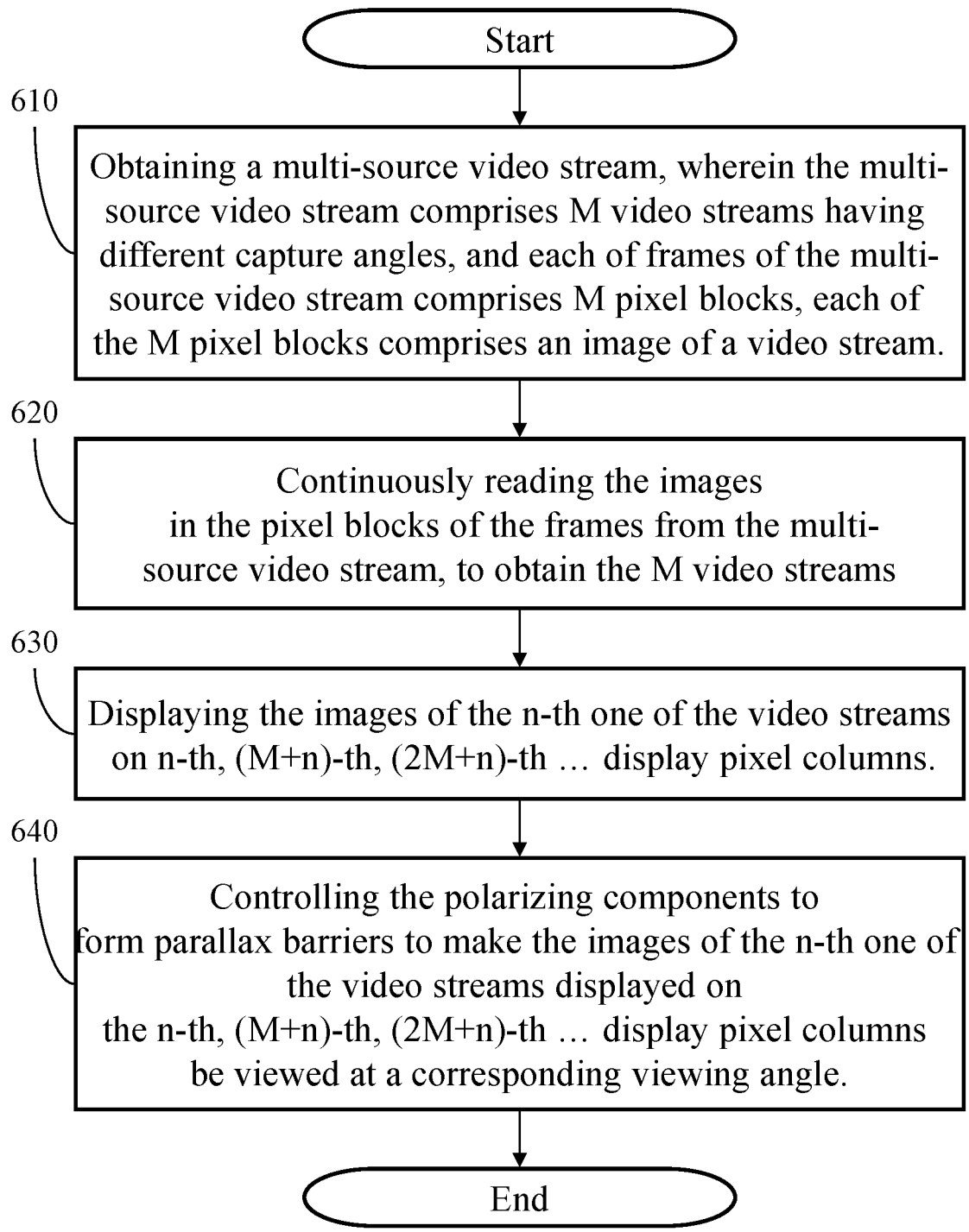
[Fig. 6]

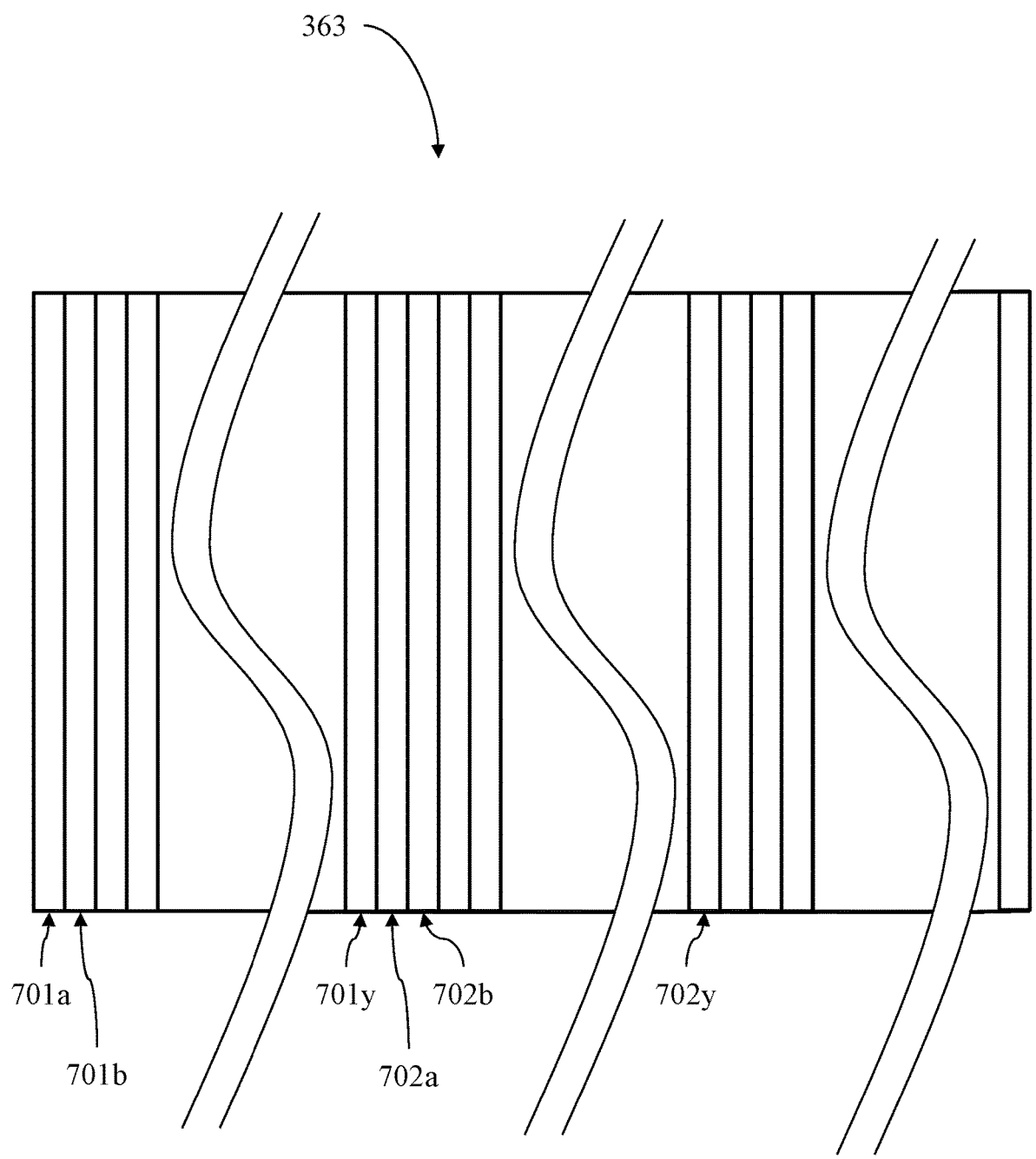
[Fig. 7]

STEREOSCOPIC DISPLAY DEVICE FOR MATCHING POLARIZED VIEWING ANGLES AND VIDEO STREAMS AND STEREOSCOPIC DISPLAY METHOD THEREOF

CROSS-REFERENCE STATEMENT

The present application is based on, and claims priority from, TAIWAN Patent Application Serial Number 111124521, filed Jun. 30, 2022, the disclosure of which is hereby incorporated by reference herein in its entirety.

BACKGROUND

1. Technical Field

The present invention is related to a display device and a method thereof, and more particularly to a stereoscopic display device for matching polarized viewing angles and video streams and a stereoscopic display method thereof.

2. Description of Related Art

With the development of smaller and more efficient electronic components, the digital photo frame for displaying digital photos has gradually become popular. So far, in addition to periodically displaying multiple digital photos, some digital photo frames have the ability to display two-dimensional digital photos by a three dimensional manner.

In recent years, most of the digital photo frames for displaying digital photos in three dimensions are to preprocess the digital photos to generate images for multiple viewing angles and then display the corresponding images in different viewing angles, so that the viewer's eyes can see the different images from different viewing angles to produce a three-dimensional effect. For example, as shown in FIG. 1, a conventional digital photo frame 100 includes a bezel 110 and a display module 130, the display module 130 includes a backlight panel 131, a polarization control unit 133, a transmissive display unit 135, the polarization control unit 133 includes polarizing components which can be driven to form parallax barriers 210 including a series of stripes. After the light emitted by the backlight panel 131 passes through the display pixel column contained in the transmissive display unit 135, the light can travel through a parallax barrier in a specific direction, so that a viewer can view the image displayed by the specific display pixel column at a specific angle only. As shown in FIG. 2, the display module 130 provides five different viewing angles, that is, the display module 130 can display five images, so that a left eye of a viewer 251 can see the images formed by light passing through display pixel columns 221, 224 and 227, a right eye of the viewer 251 can see the image formed by the light passing through display pixel columns 222, 225, and 228. Similarly, left eyes of a viewer 253 and a viewer 255 can see the image displayed by the display pixel columns 222, 225, and 228, and right eyes of the viewer 253 and the viewer 255 can see the image displayed by display pixel columns 223, 226, and 229. In addition, in other embodiments, relative positions of the transmissive display unit 135 and the polarization control unit 133 can be exchanged.

However, the above-mentioned conventional digital photo frame with three-dimensional display capability can display two-dimensional digital photos by a three-dimensional manner, the conventional digital photo frame simulates images of different viewing angle based on two-dimensional digital photos, but the photos displayed in three dimensions may be distorted or blurred. In addition, with limitation in hardware, the conventional digital photo frame with 3D display capability is able to display static digital photos in three dimensions, but unable to display videos in three dimensions.

According to above-mentioned contents, what is needed is to develop an improved solution to solve the conventional problem that the conventional 3D digital photo frame is unable to display video in three dimensions.

SUMMARY

An objective of the present invention is to disclose a stereoscopic display device for matching polarized viewing angles and video streams and a stereoscopic display method thereof, to solve the conventional technical problem that the conventional 3D digital photo frame is unable to display videos in three dimensions.

In order to achieve the objective, the present invention provides a stereoscopic display device for matching polarized viewing angles and video streams, the stereoscopic display device includes a processing module and a display module.

The processing module is configured to execute at least one computer instruction, and after executing the at least one computer instruction, the processing module generates a video stream obtaining unit, an image reading unit and an image outputting unit. The video stream obtaining unit is configured to obtain a multi-source video stream, wherein the multi-source video stream includes M video streams which are time-synchronized, the M video streams have different capture angles, respectively, and each of frames of the multi-source video streams comprises M pixel blocks, each of the M pixel blocks comprises an image, the pixel blocks of the different frames arranged at the same position have the images of one of the video streams at different time points. The image reading unit is configured to continuously read the images in the pixel blocks of each of the frames from the multi-source video stream, to obtain the video streams. The image outputting unit is configured to output the M video streams. The display module includes a transmissive display unit and a polarization control unit. The transmissive display unit includes display pixel columns, wherein the n-th, (M+n)-th, (2M+n)-th . . . display pixel columns are configured to display the images of the n-th video stream outputted by the image outputting unit, wherein n is a positive integer and 1≤n≤M. The polarization control unit includes polarizing components, wherein the polarizing components form parallax barriers to make the images of the n-th video stream displayed on the n-th, (M+n)-th, (2M+n)-th display pixel columns be viewed at corresponding viewing angle, wherein the viewing angles of the display pixel columns displaying different video streams are different, and a relative position of the viewing angle by which each of the video streams is displayed is the same as a relative position of the capture angle of each of the video streams.

In order to achieve the objective, the present invention provides a stereoscopic display method for matching polarized viewing angles and video streams, and the stereoscopic display method includes steps of: obtaining a multi-source video stream, wherein the multi-source video stream comprises M video streams having different capture angles, and each of frames of the multi-source video stream comprises M pixel blocks, each of the M pixel blocks comprises an image, and the pixel blocks of the different frames arranged at the same position have the images of one of the video streams at different time points; continuously reading the images in the pixel blocks of the frames from the multi-source video stream, to obtain the M video streams; displaying the images of the n-th one of the video streams on n-th, (M+n)-th, (2M+n)-th display pixel columns, wherein n is a positive integer and 1≤n≤M; controlling the polarizing components to form parallax barriers to make the images of the n-th one of the video streams displayed on the n-th, (M+n)-th, (2M+n)-th ... display pixel columns be viewed at a corresponding viewing angle, wherein the viewing angles of the display pixel columns displaying different video streams are different, and a relative position of the viewing angle by which one of the video streams is displayed is the same a relative position of the capture angle of the one of the video streams.

According to the above-mentioned stereoscopic display device and stereoscopic display method of the present invention, the difference between the present invention and the conventional technology is that in the present invention the time-synchronized video streams are obtained from the multi-source video stream, and the images of the n-th video stream are outputted to the n-th, (M+n)-th, (2M+n)-th ... display pixel columns of the display module based on the capture angle of the n-th video stream, to make the images of the n-th video stream displayed on the n-th, (M+n)-th, (2M+n)-th ... display pixel columns of the display module be viewed by the different viewing angle through parallax barriers controlled by the display module, so as to solve the convention technical problem and achieve the effect of displaying 3D video stream on the existing 3D digital photo frame.

BRIEF DESCRIPTION OF THE DRAWINGS

The structure, operating principle and effects of the present invention will be described in detail by way of various embodiments which are illustrated in the accompanying drawings.

FIG. 3 is a schematic view of function blocks of a stereoscopic display device for matching polarized viewing angles and video streams, according to the present invention.

FIG. 4 is a schematic view of multiple image capture devices capturing images by different angles, according to an embodiment of the present invention.

FIG. 5 is a schematic view of pixel blocks of a frame of multi-source video stream, according to an embodiment of the present invention.

FIG. 6 is a flowchart of a stereoscopic display method for matching polarized viewing angles and video streams, according to the present invention.

FIG. 7 is a schematic view of display pixel columns of a display module, according to an embodiment of the present invention.

DETAILED DESCRIPTION OF THE PREFERRED EMBODIMENTS

Figure 1:
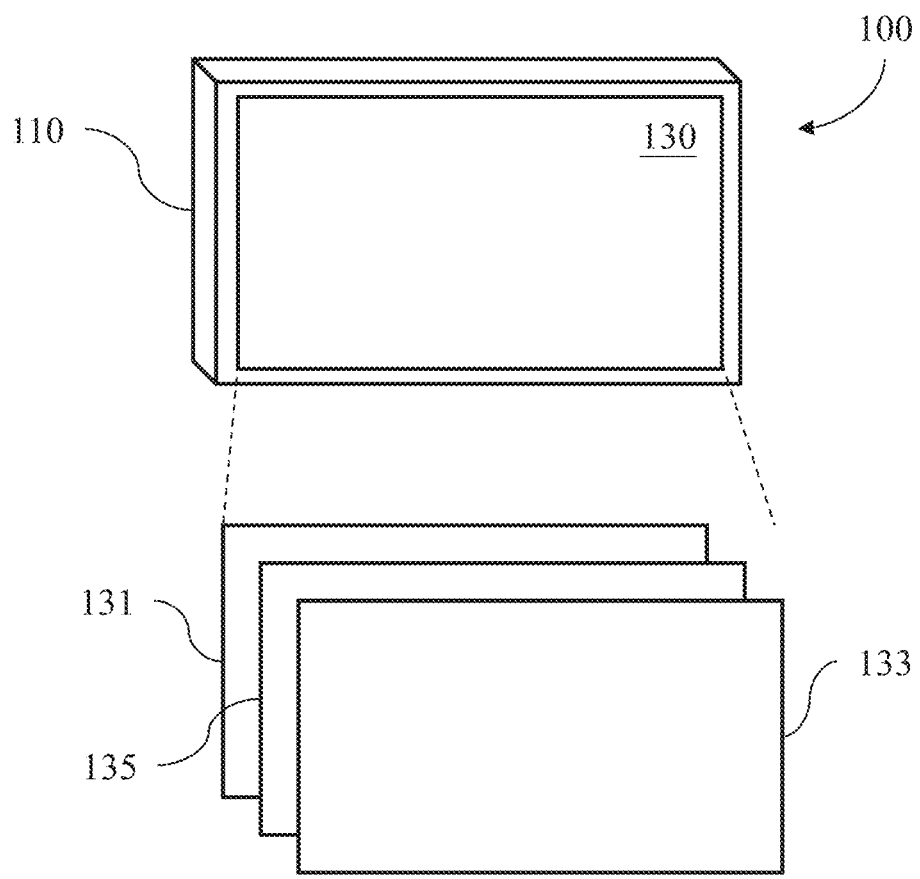
FIG. 1 is a schematic view of a conventional digital photo frame in the related art.
Figure 2:
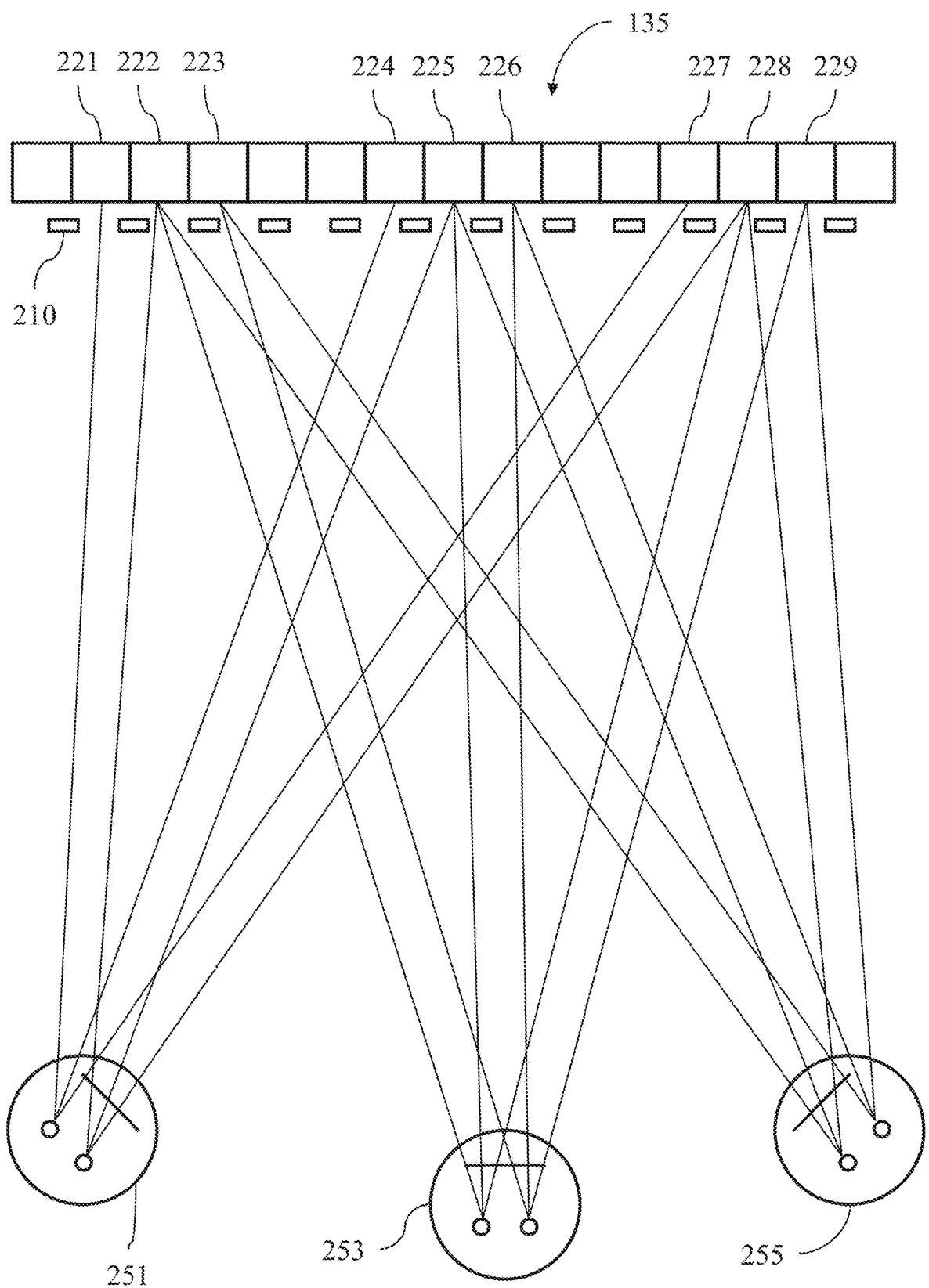
FIG. 2 is a schematic view of an operation of viewing different images through parallax barriers on a conventional digital photo frame in the related art.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The present invention is able to display multiple time-synchronized video streams in a stereoscopic manner.

The system operation of the present invention will be illustrated with reference to FIG. 3, which is a schematic view of function blocks of a stereoscopic display device for matching polarized viewing angles and video streams, according to the present invention. The stereoscopic display device can be a computing apparatus.

The computing apparatus mentioned in the present invention includes, but not limited to, one or more processing modules, one or more memory modules, and a bus connected to hardware components (including memory modules and processing modules). Through the above-mentioned hardware components, the computing apparatus can load and execute the operating system, so that the operating system can be executed on the computing apparatus, and can also execute software or programs. In addition, the computing apparatus also includes a housing, and the above-mentioned hardware components are arranged in the housing.

The bus of the computing apparatus mentioned in the present invention may be implemented by one or more types of bus; for example, the bus can include a data bus, an address bus, a control bus, an expansion bus or a local bus.

The bus of computing apparatus can include, but not limited to, Industry Standard Architecture (ISA) bus, Peripheral Component Interconnect (PCI) bus, Video Electronics Standards Association (VESA) local bus, Universal Serial Bus (USB), PCI Express (PCI-E/PCIe) bus, etc.

The processing module of the computing apparatus is coupled with the bus. The processing module includes a register group or a register space. The register group or the register space can be completely set on the processing chip of the processing module, or can be all or partially set outside the processing chip and is coupled to the processing chip through dedicated electrical connection and/or a bus. The processing module can be a central processing unit, a microprocessor, or any suitable processing component. If the computing apparatus is a multi-processor apparatus, that is, the computing apparatus includes processing modules, and the processing modules can be all the same or similar, and coupled and communicated with each other through a bus. The processing module can interpret a computer instruction or a series of multiple computer instructions to perform specific operations or operations, such as mathematical operations, logical operations, data comparison, data copy/moving, so as to drive other hardware component, execute the operating system, or execute various programs and/or module in the computing apparatus. The computer instruction may be an assembly instruction, an instruction set architecture (ISA) instruction, a machine instruction, a machine-related instruction, a microcode, a firmware instruction, or a source code or an object code written in any combination of two or more programming languages. And the computer instruction may be executed entirely on a single computing apparatus, partly on a single computing apparatus, or partly on one computing apparatus and partly on another connected computing device. The above-mentioned programming languages include object-oriented programming languages, such as Common Lisp, Python, C++, Objective-C, Smalltalk, Delphi, Java, Swift, C#, Perl, Ruby, etc., and conventional procedural programming languages, such as C language or other similar programming language.

The computing apparatus usually also includes one or more chipsets. The processing module of the computing apparatus can be coupled to the chipset, or electrically connected to the chipset through the bus. The chipset includes one or more integrated circuits (IC) including a memory controller and a peripheral input/output (I/O) controllers, that is, the memory controller and the peripheral input/output controller can be implemented by one integrated circuit, or implemented by two or more integrated circuits. Chipsets usually provide I/O and memory management functions, and multiple general-purpose and/or dedicated-purpose registers, timers. The above-mentioned general-purpose and/or dedicated-purpose registers and timers can be coupled to or electrically connected to one or more processing modules to the chipset for being accessed or used.

The processing module of the computing apparatus can also access the data stored in the memory module and mass storage area installed on the computing apparatus through the memory controller. The above-mentioned memory modules include any type of volatile memory and/or non-volatile memory (NVRAM), such as Static Random Access Memory (SRAM), Dynamic Random Access Memory (DRAM), Read-Only Memory (ROM), or Flash memory. The above-mentioned mass storage area can include any type of storage device or storage medium, such as hard disk drives, optical discs, flash drives, memory cards, and solid state disks (SSD), or any other storage device. In other words, the memory controller can access data stored in static random access memory, dynamic random access memory, flash memory, hard disk drives, and solid state drives.

The processing module of the computing apparatus can also connect and communicate with peripheral devices and interfaces including peripheral output devices, peripheral input devices, communication interfaces, or various data or signal receiving devices through the peripheral I/O controller and the peripheral I/O bus. The peripheral input device can be any type of input device, such as a keyboard, mouse, trackball, touchpad, or joystick. The peripheral output device can be any type of output device, such as a display, or a printer; the peripheral input device and the peripheral output device can also be the same device such as a touch screen. The communication interface can include a wireless communication interface and/or a wired communication interface. The wireless communication interface can include the interface capable of supporting wireless local area networks (such as Wi-Fi, Zigbee, etc.), Bluetooth, infrared, and near-field communication (NFC), 3G/4G/5G and other mobile communication network (cellular network) or other wireless data transmission protocol; the wired communication interface can be an Ethernet device, a DSL modem, a cable modem, an asynchronous transfer mode (ATM) devices, or optical fiber communication interfaces and/or components. The data or signal receiving device can include a GPS receiver or a physiological signal receiver, and physiological signal received by the physiological signal receiver includes but not limit to heartbeat, blood oxygen, etc. The processing module can periodically poll various peripheral devices and interfaces, so that the computing apparatus can input and output data through various peripheral devices and interfaces, and can also communicate with another computing apparatus having the above-mentioned hardware components.

As shown in FIG. 3, a stereoscopic display device 300 includes a processing module 310, a display module 360, a communication module 330 and a storage module 340. In an embodiment, the communication module 330 and the storage module 340 are optional. It should be noted that the processing module 310, the display module 360, the communication module 330 and the storage module 340 could be concentrated in the same device or scatted in different devices. The above-mentioned device(s) can be computer apparatus, that is, one or more devices (computer apparatuses) may implement the system of the present invention. The processing module 310, the display module 360, the communication module 330 and the storage module 340 connects through a bus when the system of the present invention is implemented by one device or connects through wire or wireless technology when the system of the present invention is implemented by two or more devices.

The processing module 310 is configured to obtain a multi-source video stream, and obtain video streams from the obtained multi-source video stream. In an embodiment, the processing module 310 includes a video stream obtaining unit 311, an image reading unit 313, and an image outputting unit 315. For example, the video stream obtaining unit 311, the image reading unit 313 and the image outputting unit 315 can be hardware modules (such as chips, electronic components or circuits) of the processing module 310, and the processing module 310 is a general term for circuits, electronic components, and chips that implement the above-mentioned modules (311-315). The above-mentioned electronic components include but are not limited to complex programmable logic devices (CPLD), and the above-mentioned chips are, for example, application specific integrated circuits (ASIC), system on chip (SoC), field programmable gate array (FPGA), but the present invention is not limited thereto. On the other hand, the video stream obtaining unit 311, the image reading unit 313 and the image outputting unit 315 can also be software modules generated by the processing module 310 after the processing module 310 executes a computer instruction or a set of computer instructions; however, the present invention is not limited to the above-mentioned examples. In general, the computer instructions executed by the processing module 310 are stored inside the processing module 310 or the storage module 340, such as memory module or storage medium of the stereoscopic display device 300, but the present invention is not limited to above-mentioned examples.

The video stream obtaining unit 311 is configured to obtain the multi-source video stream. In general, the video stream obtaining unit 311 can receive the multi-source video stream through the communication module 330 through network, or the video stream obtaining unit 311 can read the multi-source video stream from a multimedia file stored in a storage device connected to the stereoscopic display device 300, or the video stream obtaining unit 311 can read the multi-source video stream from the multimedia file stored in the storage module 340. It is should be noted that the storage device is not shown in figures herein.

The multi-source video stream obtained by the video stream obtaining unit 311 includes M video streams, the M video streams contained in the multi-source video stream are synchronized in time with each other, and the capture angles by which the video streams are captured respectively are different from each other; in other words, the video streams contained in the multi-source video stream are captured by different capture angles at the same time. As shown in FIG. 4, multiple image capture devices 411~425 perform image capture for a shooting target 430 by different capture angles at the same time to generate time-synchronized video streams. In general, the shooting targets in the video streams contained in the multi-source video stream are the same, but the present invention is not limited to above-mentioned examples, for example, some image capture devices generating the video stream can shoot a specific target, and another image capture devices generating the video stream can shoot ambient environment around the specific target. The image capture devices 411~425 can be cameras, but the present invention is not limited thereto for example, the image capture devices 411~425 can be mobile phones or digital still cameras.

Each of the frames in the multi-source video stream includes M pixel blocks, in an embodiment, the frame can include more than M image blocks. As shown in FIG. 5, the frame 500 includes 25 pixel blocks, but the present invention is not limited to above-mentioned examples. The sizes and amount of the pixel blocks in the frames of the multi-source video stream are the same, and different pixel block of each frame in the multi-source video stream has an image of the video stream captured by different viewing angle. The image is a frame of a video stream. It is to be noted that the video streams of the multi-source video stream are synchronized in time, so the frames (that is, the images) of the video streams in the pixel blocks of the same frame of the multi-source video stream are also synchronized in time, that is, the images in the pixel blocks of the same frame in the multi-source video stream are captured at the same time.

In general, in the multi-source video stream, the position of the image (that is, a frame) of each video stream in the multi-source video stream is fixed, in other words, in the multi-source video stream, the images in the pixel blocks of the frames that are arranged at the same positions are the images of the same video stream at different time points. For example, when the image of the video stream captured by the image capture device 411 is arranged in the pixel block 511 at the upper leftmost corner, the images of the video stream captured by the image capture device 411 are constantly arranged in the pixel blocks 511 at the upper leftmost corner of the frames of the multi-source video stream.

It should be particularly noted that in the multi-source video stream the position of the image of a video stream in the pixel blocks of the frame is determined by the capture angle of the video stream, that is, the position is determined based on a relative position of the image capture device generating the video stream. In an embodiment, the relative position of the image capture device can be determined based on device identification data of the image capture device, for example, the relative positions of the image capture devices can be determined based on a numerical order of the device identification data of the image capture devices. The device identification data can be, but not limited to, a network address, ID or serial number set by a user. For example, when 25 cameras that are used as image capture devices are used to generate video streams, and the 25 cameras are labelled as the camera No. 1 to the camera No. 25 (their device identification data is 1 to 25) based on the positions of the cameras with respect to the shooting target, respectively, the image of the video stream generated and captured by the camera No. 1 is arranged at the pixel block 511 at the upper leftmost corner of the frame 500 in the multi-source video stream; the image of the video stream generated and captured by the camera No. 2 is arranged at the pixel block 512 at the second position, from left to right, in the first row of the frame 500 in the multi-source video stream; the image of the video stream generated and captured by the cameras No. 3~5 are arranged at the pixel blocks 513~515 from middle to right side in the first row of the frame 500 in the multi-source video stream; the images of the video streams generated and captured by the cameras No. 6~10 are arranged at the pixel blocks 521~525 in the second row of the frame 500 in the multi-source video stream, in sequential order, and so forth. The images of the video streams generated and captured by the cameras No. 11~15 are arranged in the third row of the frame 500 in the multi-source video stream, in sequential order; the images of the video streams generated and captured by the cameras No. 16~20 are arranged at the pixel blocks 513~515 in the fourth row of the frame 500 in the multi-source video stream, in sequential order; the images of the video streams generated and captured by the cameras No. 21~25 are arranged in the fifth row of the frame 500 in the multi-source video stream, in sequential order.

The image reading unit 313 is configured to continuously read the images in the pixel blocks of each frame from the multi-source video stream obtained by the video stream obtaining unit 311, to obtain the video streams contained in the multi-source video stream.

In more detail, when the position of the pixel block corresponding to an image of a video stream in the frame of the multi-source video stream is determined based on the capture angle of the video stream, that is, the position of the image of the video stream in the frame of the multi-source video stream is determined based on the relative position (or the device identification data) of the image capture device generating the video stream, the image reading unit 313 reads the images of the video streams from each frame of the multi-source video stream in a sequence from left to right from top to bottom, in sequential order, and can generate the video stream captured by the image capture device at the capture angle (or the relative position or the device identification data) corresponding to the position of the pixel block of the read images based on a timing order of reading the images from the frames in the multi-source video stream.

In an embodiment, when the position of the image of the video stream in the pixel blocks of the frame of the multi-source video stream is not defined specifically, in other words, the position of the image of the video stream in the pixel blocks of the frame of the multi-source video stream can be determined arbitrarily. Based on an arrangement order (or the relative positions, or the capture angles or the device identification data) of the image capture devices generating the images in the pixel blocks of the frames of the multi-source video stream (the arrangement order is recorded in a header of the multi-source video stream), the image reading unit 313 can read the images of each video stream from the frames of the multi-source video stream, and arrange the read images based on the timing order of reading the frames in the multi-source video stream, to generate the streaming video captured by each image capture device.

In an embodiment, the arrangement order (or the relative positions, or the capture angles, or the device identification data) of the image capture devices is not limited to be recorded in the header of the multi-source video stream, for example, the above-mentioned the arrangement order (or the relative positions, or the capture angles, or the device identification data) can be recorded in certain pixel block not having any image in the frame of the multi-source video stream. For example, when the frame of the multi-source video stream is divided into 25 pixel blocks, and the multi-source video stream includes 24 or less video streams, and an unused pixel block can be used to record the arrangement order (or the relative positions, or the capture angles, or the device identification data) of the image capture devices, and/or the arrangement order (or the relative positions where the images are captured, or the capture angles by which the images are captures, or the device identification data) of the images included in the pixel blocks of the frame of the multi-source video stream. The unused pixel block can be at any position in the frame of the multi-source video stream, and the present invention is not limited to the above-mentioned example.

Based on the arrangement order (or relative positions or capture angle or device identification data) of the image capture devices generating the images in the pixel blocks of the frame read by the image reading unit 313, the image outputting unit 315 outputs the images to the display module 360, respectively, so that the display module 360 displays different video streams by different viewing angles. In more detail, based on the arrangement order (or relative positions, or the capture angle or the device identification data) of the image capture devices generating the images, the image outputting unit 315 outputs pixel columns of each image to the corresponding display pixel columns (that is, columns of display pixels) of the display module 360 one by one. For example, when the multi-source video stream includes 25 video streams, the image capture device generating the 25 video streams are labelled as the first image capture device to 25th image capture device based on the arrangement order of relative positions or the capture angles, respectively; the image outputting unit 315 outputs the j-th pixel row of the image in the video stream generated by the i-th image capture device to the j-th display pixel row of the display module 360 for displaying with the i-th viewing angle. In an actual example, as shown in FIG. 7, when the display module 360 includes multiple display pixel columns, the first display pixel column of the image with the first viewing angle (that is, the image generated by the first image capture device) can be displayed on the first display pixel column 701a of the display module 360; the first display pixel column of the image with the second viewing angle (that is, the image is generated by the second image capture device) can be displayed on the second display pixel column 701b of the display module 360, and so forth; the first display pixel column of the image with the 25th viewing angle (that is, the image is generated by the image capture device) can be displayed on the 25th display pixel column 701y of the display module 360. The second display pixel column of the image with the first viewing angle (that is, the image is generated by the first image capture device) can be displayed on the 26th display pixel column 702a of the display module 360, the second display pixel column of the image with the second viewing angle (that is, the image is generated by the second image capture device) can be displayed on the 27th display pixel column 702b of the display module 360, and so forth, the second display pixel column of the image with the 25th viewing angle (that is, the image is generated by the 25th image capture device) can be displayed on the 25th display pixel column 702y of the display module 360, and so forth. Each of i and j is a positive integer greater than zero, and i is lower than or equal to 25, j is lower than or equal to a horizontal resolution of the image. It is worth noting that the relative position of the viewing angle by which the i-th video stream is displayed is the same as the relative position of the capture angle of the i-th video stream.

In an embodiment, the image outputting unit 315 can convert the image in the pixel block included in the frame read by the image reading unit 313 into the image format supported by the display module 360, and output the image with the converted format to the display module 360.

The communication module 330 is connected to a file server and/or a streaming server (not shown in figures) through a wired or wireless network, to download the multi-source video stream from the file server or the streaming server.

The display module 360 is configured to display the video streams outputted from the image outputting unit 315 by different viewing angles, respectively. In an embodiment, the display module 360 includes a backlight panel 361, a transmissive display unit 363, and a polarization control unit 365. The polarization control unit 365 and the backlight panel 361 are disposed on the same side or different sides of the transmissive display unit 363; in other words, in the display module 360 the backlight panel 361, the transmissive display unit 363 and the polarization control unit 365 can be in an order of the backlight panel 361, the transmissive display unit 363 and the polarization control unit 365, or in an order of the backlight panel 361, the polarization control unit 365 and the transmissive display unit 363.

The backlight panel 361 has the same function as that of a backlight module of a conventional displayer, and is configured to emit light to fully or partially travel through the transmissive display unit 363 to eyes of a viewer.

The transmissive display unit 363 can be a liquid crystal panel of the conventional displayer, and is configured to display the images of the video stream outputted by the image outputting unit 315. The transmissive display unit 363 includes display pixel columns, the n-th, (M+n)-th, (2M+n)-th display pixel columns are configured to display the images of the n-th video stream, wherein M is the total number of the video streams included in the multi-source video stream, wherein n is a positive integer and $1 \leq n \leq M$.

Each of the pixel blocks includes polarizing components, the polarization control unit 365 controls the voltages applied on the polarizing components to generate multiple parallax barriers, so as to make the images of the n-th video stream displayed on the n-th, (M+n)-th, (2M+n)-th display pixel columns of the transmissive display unit 363 be viewed by the viewer at a specific viewing angle.

It is to be noted that, through the parallax barriers produced by the polarization control unit 365, the display pixel columns displaying different video streams can be viewed by the viewers at different viewing angles, that is, the viewer at a viewing angle usually can view the display pixel columns displaying the same video stream only, the viewer at a specific position can view the images of the specific video stream only; when the viewer moves to a position with a different viewing angle, the viewer can view the images of different video stream.

Next, the operation of the system and method of the present invention will be described with an embodiment. Please refer to FIG. 6, which is a flowchart of a stereoscopic display method for matching polarized viewing angles and video streams, according to the present invention. In this embodiment, the stereoscopic display device 300 provides a digital photo frame with 25 viewing angles, but the present invention is not limited to above-mentioned example.

In a step 610, after the user activates the stereoscopic display device 300, the processing module 310 of the stereoscopic display device 300 starts obtaining the multi-source video stream having video streams that are time-synchronized and captured by different capture angles. In this embodiment, the video stream obtaining unit 311 generated by the processing module 310 or the video stream obtaining unit 311 included in the processing module 310 can be linked to a specific file server or streaming server to receive the multi-source video stream through a communication module 330 of the stereoscopic display device 300, or the video stream obtaining unit 311 can read the multi-source video stream from a multimedia file stored in the storage module 340 connected to the stereoscopic display device 300 or the storage module 340 built in the stereoscopic display device 300.

In a step 620, after the processing module 310 of the stereoscopic display device 300 obtains the multi-source video stream, the processing module 310 continuously reads the images in the pixel blocks of each frame of the multi-source video stream, to obtain the video streams included in the multi-source video stream. In this embodiment, the images of the video streams included in the multi-source video stream are arranged in the pixel blocks of the frame of the multi-source video stream based on the shooting locations/capture angles relative to the shooting target in sequential order; for example, as shown in FIG. 5, in the frame 500 of the multi-source video stream, the image captured by the image capture device arranged the leftmost or rightmost side relative to the shooting target is arranged in the pixel block 511; the images of video stream generated by another image capture devices are arranged in the pixel blocks in the order from left to right, and from up to down in sequential order; the image reading unit 313 of the processing module 310 starts to read the images of the video streams from each frame 500.

In a step 630, after the processing module 310 of the stereoscopic display device 300 reads the images of the video streams from the multi-source video stream, the processing module 310 outputs the images to the display module 360 based on the arrangement order of the image capture devices generating the images in the pixel blocks of each frame read by the image reading unit 313, respectively; that is, the image of the n-th video stream is outputted to the n-th, (M+n)-th, (2M+n)-th . . . display pixel columns of the display module 360. In this embodiment, as shown in FIG. 7, the image of the video stream generated by the image capturing module 411 is outputted to the first, 26th, 51th . . . display pixel columns (that is, the display pixel columns 701a, 702a, . . . ) of the transmissive display unit 363 of the display module 360, the image of the video stream generated by the image capturing module 412 is outputted to the second, 27th, 52th . . . display pixel columns (that is, the display pixel columns 701b, 702b . . . ) of the transmissive display unit 363 of the display module 360, and so forth.

In a step 640, when the processing module 310 of the stereoscopic display device 300 outputs the images to the display module 360 (the step 630) based on the arrangement order (or the relative positions or the capture angles) of the image capture devices generating the images in the pixel blocks of each frame, the display module 360 drives the polarization control unit 365 to control the polarizing components of the polarization control unit 365 to form parallax barriers, so that the image of the n-th video stream displayed on the n-th, (M+n)-th, (2M+n)-th . . . display pixel columns of the display module 360 can be viewed at the corresponding viewing angle. In this embodiment, the image of the first video stream (that is, the video stream captured by the image capture device 411) displayed on the first, 26th, 51th . . . display pixel columns (that is, the display pixel columns 701a, 702a . . . ) of the transmissive display unit 363 of the display module 360 can be viewed by the viewing angle at the most right side (that is, the viewing angle where the image capture device 411 captures the first video stream); the second video stream (that is, the video stream captured by the image capture device 412) displayed on the second, 27th, 52th . . . display pixel columns (that is, the display pixel columns 701b, 702b . . . ) of the transmissive display unit 363 of the display module 360 can be viewed by the viewing angle at the position slightly closer to the middle from the rightmost position, and so forth; the image of the 25th video stream displayed on the 25th, 50th, 75th . . . display pixel columns (that is, the display pixel columns 701y, 702y . . . ) of the transmissive display unit 363 of the display module 360 can be view by the viewing angle at the leftmost side (that is, the viewing angle where the image capture device 425 captures the 25th video stream).

As a result, the above-mentioned solution of the present invention enables the digital photo frame having a 3D display function to display video streaming without pre-processing the video streaming to be displayed and without changing hardware operation of the digital photo frame.

According to above-mentioned contents, the difference between the present invention and the conventional technology is that in the present invention the time-synchronized video streams are obtained from the multi-source video stream, and the images of the n-th video stream are outputted to the n-th, (M+n)-th, (2M+n)-th . . . display pixel columns of the display module based on the capture angle of the n-th video stream, to make the images of the n-th video stream displayed on the n-th, (M+n)-th, (2M+n)-th . . . display pixel columns of the display module be viewed by the different viewing angle through parallax barriers controlled by the display module, so as to solve the convention technical problem that the conventional 3D digital photo frame is unable to display video in three dimensions, thereby achieving the effect of displaying 3D video stream on the conventional 3D digital photo frame.

Furthermore, the stereoscopic display method for matching polarized viewing angles and video streams according to the present invention can be implemented by hardware, software or a combination thereof, and can be implemented in a computer system by a centralization manner, or by a distribution manner of different components distributed in several interconnect computer systems.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A stereoscopic display device for matching polarized viewing angles and video streams, wherein the stereoscopic display device comprises:
   a communication module;
   a storage module;
   a processing module coupled to the communication module and the storage module, the processing module comprises:
      a video stream obtaining unit configured to obtain a multi-source video stream through the communication module or from the storage module, wherein the multi-source video stream comprises M video streams which are time-synchronized, the M video streams have different capture angles, respectively, and each of frames of the multi-source video streams comprises M pixel blocks, each of the M pixel blocks comprises an image, the pixel blocks of the different frames arranged at same position have the images of one of the video streams at different time points;
      an image reading unit coupled to the video stream obtaining unit and configured to continuously read the images in the pixel blocks of each of the frames from the multi-source video stream, to obtain the video streams; and
      an image outputting unit coupled to the image reading unit and configured to output the M video streams; and
   a display module coupled to the processing module and configured to display the M video streams, comprising:
      a transmissive display unit, comprising display pixel columns, wherein the n-th, (M+n)-th, (2M+n)-th . . . display pixel columns are configured to display the images of the n-th video stream outputted by the image outputting unit, wherein n is a positive integer and $1 \leq n \leq M$; and
      a polarization control unit, comprising polarizing components, wherein the polarizing components form parallax barriers to make the images of the n-th video stream displayed on the n-th, (M+n)-th, (2M+n)-th . . . display pixel columns be viewed at corresponding viewing angle, wherein the viewing angles of the display pixel columns displaying different video streams are different, and a relative position of the viewing angle by which each of the video streams is displayed is the same as a relative position of the capture angle of each of the video streams.

2. The stereoscopic display device for matching polarized viewing angles and video streams according to claim 1, wherein a position of one of the pixel blocks of the frame corresponding to the image of one of the video streams is determined based on the capture angle of the one of the video streams, or a relative position, device identification data, or an arrangement order of the image capture device generating the one of the video streams.

3. The stereoscopic display device for matching polarized viewing angles and video streams according to claim 1, wherein a position of one of the pixel block in the frame corresponding to the image of one of the video streams is recorded in a header of the multi-source video stream, or one of the pixel blocks contained in the frame of the multi-source video stream.

4. The stereoscopic display device for matching polarized viewing angles and video streams according to claim 1, wherein the video stream obtaining unit receives the multi-source video stream from network or reads the multi-source video stream from a storage device connected to the stereoscopic display device through the communication module or reads a multimedia file stored in the storage module of the stereoscopic display device.

5. The stereoscopic display device for matching polarized viewing angles and video streams according to claim 1, wherein the display module comprises a backlight panel, the polarization control unit and the backlight panel are disposed on the same side or different sides of the transmissive display unit.

6. A stereoscopic display method for matching polarized viewing angles and video streams, wherein the stereoscopic display method is applicable to a stereoscopic display device comprising a display module, the display module comprises a transmissive display unit and a polarization control unit, the transmissive display unit comprises display pixel columns, the polarization control unit comprises polarizing components, and the stereoscopic display method comprises:
   obtaining a multi-source video stream by the stereoscopic display device, wherein the multi-source video stream comprises M video streams having different capture angles, and each of frames of the multi-source video stream comprises M pixel blocks, each of the M pixel blocks comprises an image, and the pixel blocks of the different frames arranged at same position have the images of one of the video streams at different time points;
   continuously reading the images in the pixel blocks of the frames from the multi-source video stream, to obtain the M video streams, by stereoscopic display device;
   displaying the images of the n-th one of the video streams on n-th, (M+n)-th, (2M+n)-th . . . display pixel columns by stereoscopic display device, wherein n is a positive integer and $1 \leq n \leq M$; and
   controlling the polarizing components to form parallax barriers to make the images of the n-th one of the video streams displayed on the n-th, (M+n)-th, (2M+n)-th . . . display pixel columns be viewed at a corresponding viewing angle by stereoscopic display device, wherein the viewing angles of the display pixel columns displaying different video streams are different, and a relative position of the viewing angle by which one of the video streams is displayed is the same a relative position of the capture angle of the one of the video streams.

7. The stereoscopic display method for matching polarized viewing angles and video streams according to claim 6, before the step of obtaining the multi-source video stream, further comprising:
   determining a position of one of the pixel blocks of the frame corresponding to the image of one of the video streams based on the capture angle of the one of the video streams, or a relative position, device identification data, or an arrangement order of the image capture device generating the one of the video streams, so as to generate the multi-source video stream by arranging the images of the video streams based on the positions of the pixel blocks corresponding to the video streams, respectively, by stereoscopic display device.

8. The stereoscopic display method for matching polarized viewing angles and video streams according to claim 6, wherein the step of reading the images in the pixel blocks of the frames from the multi-source video stream to obtain the video streams comprises:

respectively reading the images in the pixel blocks of the frames from the multi-source video stream based on a header of the multi-source video stream or the positions of the pixel blocks in the frames corresponding to the images of the video streams recorded in the frames of the multi-source video stream by stereoscopic display device.

9. The stereoscopic display method for matching polarized viewing angles and video streams according to claim 6, wherein the step of obtaining the multi-source video stream comprises:

receiving the multi-source video stream through network, or reading the multi-source video stream from a storage device connected to the stereoscopic display device, or reading a multimedia file stored in the stereoscopic display device.

10. The stereoscopic display method for matching polarized viewing angles and video streams according to claim 6, wherein the display module comprises a backlight panel, the polarization control unit and the backlight panel are disposed on the same side or different sides of the transmissive display unit.

* * * * *